(12) United States Patent
Bolzmacher et al.

(10) Patent No.: US 11,235,351 B2
(45) Date of Patent: Feb. 1, 2022

(54) TIME REVERSAL INTERFACE GENERATING AN ACOUSTIC LUBRICATION

(71) Applicant: COMMISSARIAT A L'ENERGIE ATOMIQUE ET AUX ENERGIES ALTERNATIVES, Paris (FR)

(72) Inventors: Christian Bolzmacher, Montrouge (FR); Charles Hudin, Paris (FR); Moustapha Hafez, Arcueil (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 213 days.

(21) Appl. No.: 16/607,235

(22) PCT Filed: Apr. 23, 2018

(86) PCT No.: PCT/FR2018/051012
§ 371 (c)(1),
(2) Date: Oct. 22, 2019

(87) PCT Pub. No.: WO2018/197794
PCT Pub. Date: Nov. 1, 2018

(65) Prior Publication Data
US 2021/0291227 A1 Sep. 23, 2021

(30) Foreign Application Priority Data
Apr. 24, 2017 (FR) ...................................... 17 53536

(51) Int. Cl.
B06B 1/02 (2006.01)
H04B 13/00 (2006.01)
H04B 11/00 (2006.01)

(52) U.S. Cl.
CPC ............ B06B 1/0215 (2013.01); H04B 11/00 (2013.01); H04B 13/005 (2013.01)

(58) Field of Classification Search
CPC ..... H04B 13/005; H04B 11/00; B06B 1/0215; G06F 3/016; G06F 3/04886; G06F 3/041;
(Continued)

(56) References Cited

U.S. PATENT DOCUMENTS 9,274,612 B2 * 3/2016 Ciesla ................. G06F 3/04886
9,372,565 B2 * 6/2016 Calub ................... G06F 1/1626
(Continued)

FOREIGN PATENT DOCUMENTS

WO    WO 2013/182611 A1    12/2013

OTHER PUBLICATIONS

International Search Report dated Jul. 18, 2018 in PCT/FR2018/051012 filed on Apr. 23, 2018.
(Continued)

Primary Examiner — Luke D Ratcliffe
Assistant Examiner — Amie M Ndure
(74) Attorney, Agent, or Firm — Oblon, McClelland, Maier & Neustadt, L.L.P.

(57) ABSTRACT

A tactile stimulation interface comprising a surface explored by touch by means of a finger of a user, actuators applying forces on said surface, and control means of the actuators, said control means sending, to the actuators, signals corresponding to the forces to be applied to said surface, the forces being determined by a time reversal method, means for detecting the contact of the finger with the surface and for monitoring the movement of the finger on the surface. The control means are capable, in order to produce an acoustic lubrication effect in at least one given area of the surface, of generating a signal formed from a convolution of
(Continued)

a pulsed response returned by a continuous function representative of the acoustic lubrication effect.

20 Claims, 3 Drawing Sheets

(58) Field of Classification Search
CPC ......... G06F 2203/04809; G06F 3/0416; G06F 3/04845; G06F 3/043; G06F 3/0488; G06F 2203/014; G06F 2203/04108; G06F 2203/04102; G06F 3/0202; G06F 3/045; G06F 3/042; G06F 3/0447; H01L 41/0906; H02N 2/003; H02N 2/103; H02N 2/108; H02N 2/007; B60K 2370/11; B60K 2370/1438; B60K 2370/113; H01H 13/84; H01H 2223/062; H01H 2217/018; H01H 2215/046
See application file for complete search history.

(56) References Cited

U.S. PATENT DOCUMENTS

| | | | | |
|---|---|---|---|---|
| 9,588,684 B2* | 3/2017 | Yairi | ................... | G06F 3/04886 |
| 9,612,659 B2* | 4/2017 | Ciesla | .................... | G06F 3/045 |
| 10,063,163 B2* | 8/2018 | Leroy | .................... | H02N 2/003 |
| 2010/0182245 A1* | 7/2010 | Edwards | ............. | G06F 3/04886 |
| | | | | 345/173 |
| 2015/0169060 A1* | 6/2015 | Hudin | .................... | G06F 3/016 |
| | | | | 345/173 |

OTHER PUBLICATIONS

French Preliminary Search Report dated Sep. 1, 2017 in French Application 1753536 filed on Apr. 24, 2017.
Hudin, C. et al., "Localized Tactile Feedback on a Transparent Surface through Time-Reversal Wave Focusing," IEEE Transactions on Haptics, vol. 8, No. 2, Apr. 2015, pp. 188-198, XP011584737.
Watanabe, T. et al., "A Method for Controlling Tactile Sensation of Surface Roughness Using Ultrasonic Vibration," IEEE International Conference on Robotics and Automation, 1995, pp. 1134-1139.
U.S. Appl. No. 15/765,748, filed Apr. 4, 2018, US 2018/0284891 A1, Laurent Eck, et al.
U.S. Appl. No. 15/770,879, filed Apr. 25, 2018, US 2018/0314375 A1, Charles Hudin, et al.
U.S. Appl. No. 16/317,197, filed Jan. 11, 2019, US 2019/0294248 A1, Edouard Leroy, et al.
U.S. Appl. No. 16/498,874, filed Sep. 27, 2019, Charles Hudin.

* cited by examiner

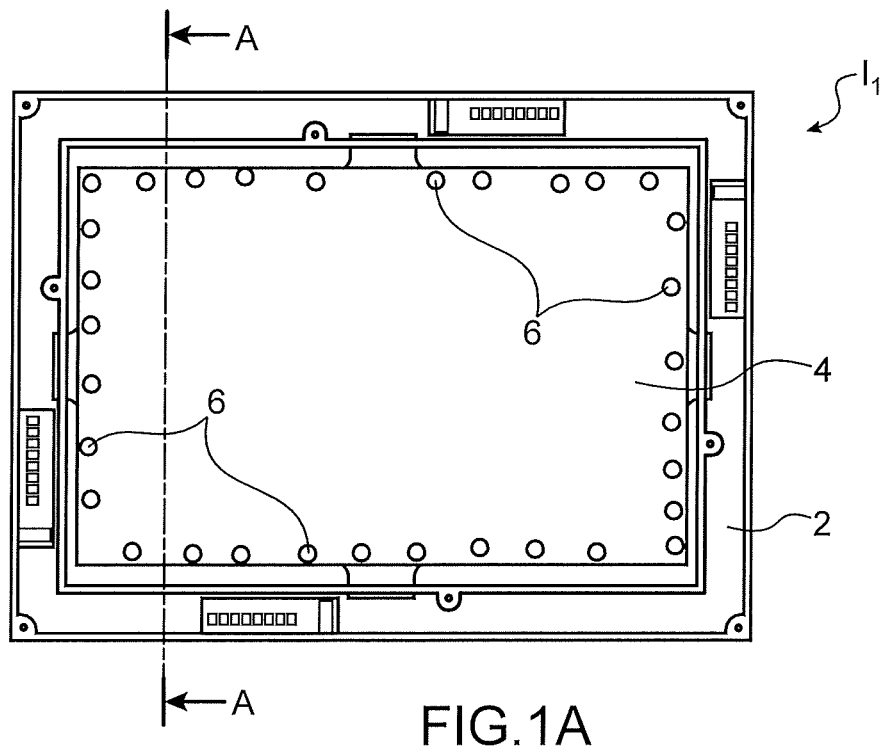
FIG.1A
FIG.1B
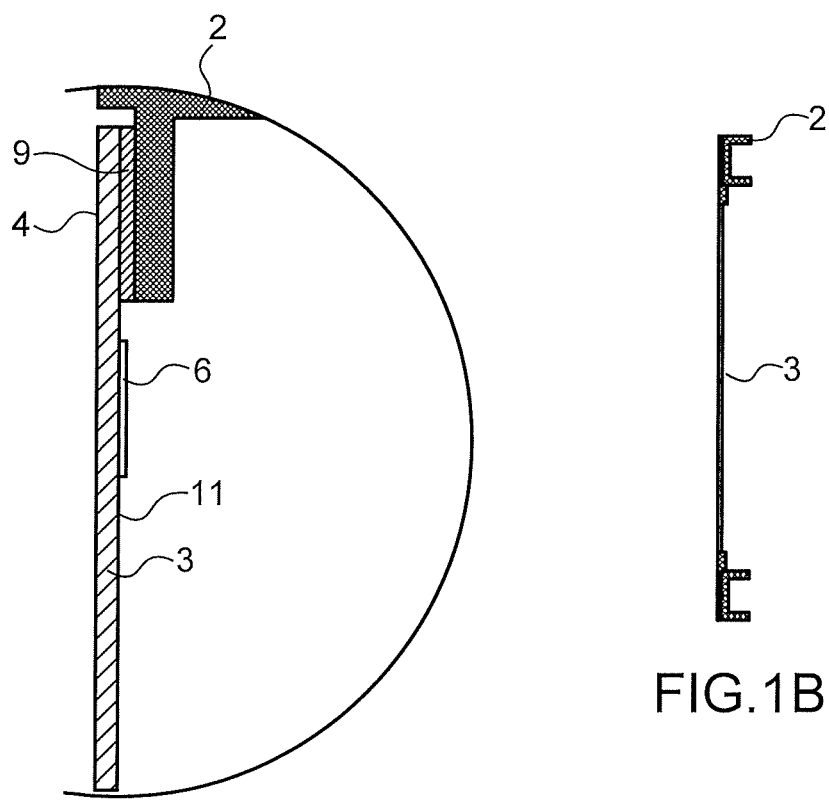
FIG.1C

TIME REVERSAL INTERFACE GENERATING AN ACOUSTIC LUBRICATION

TECHNICAL FIELD AND STATE OF PRIOR ART

The present invention relates to a time reversal interface able to generate an acoustic lubrication, which can especially be implemented in a tactile interface, for example to simulate a texture effect. The interface according to the invention can also be implemented in the field of micromanipulation, optics, biology, Tactile simulation interfaces are used for example in the field of human-machine interfaces. They can also be used in the fields of optics, acoustics, chemistry, and automated manufacturing . . . . A tactile stimulation interface can for example be implemented in smartphones, screens, dashboards, pads . . . .

A tactile interface is for example able to reproduce a tactile piece of information, such as a texture, a relief, a time and/or space varying roughness, an illusion of pressing a flexible material, of pressing a key, as a function of the information present on the screen and/or of the operation performed by the user.

The objective is in particular to reproduce the sensation of a texture while tactilely exploring a surface.

To do so, ultrasonic vibrations are generated in a plate; by correlating the amplitude of the vibrations with the motion of a finger at the surface of the plate, the user has the illusion of a textured surface. It is in fact a matter of varying the friction coefficient between the finger and the plate, this is known as an acoustic lubrication or a squeeze film. The modulation of the lubrication level as a function of the position of the finger, more particularly the alternation between high and then low friction coefficient areas, is perceived by the user as a texture. The friction decrease produces an effect only perceptible when the finger is moving on the surface.

Such a technique is for example described in document T. Watanabe and S. Fukuki, "*A method for controlling tactile sensation of surface roughness using ultrasonic vibration*," presented at the IEEE International Conference on Robotics and Automation, 1995, pp. 1134-1139.

In order to produce these vibrations, a state-of-the-art interface implements a network of actuators, for example piezoelectric or electrostatic actuators, which apply a motion to the surface of the interface. But, in order to produce a perceptible effect and simulate a friction decrease, the amplitude in the vibrations produced is at least in the order of the micrometre. To reach such an amplitude, the surface of the plate is resonated by driving the actuators with a frequency harmonic signal corresponding to an eigen frequency of the surface. This excitation, identical for all the actuators, has several drawbacks:

on the one hand, the whole surface is vibrated by the actuators. As a result, all the fingers in contact with the surface substantially perceive the same stimulus, indeed this sensation depends on the position of the fingers with respect to the nodes and antinodes of vibrations, but this position is not controllable. It is therefore not possible, in the case where at least two fingers are in contact with the surface, to adjust the vibration amplitude at each finger and therefore to stimulate a different texture for each finger.

On the other hand, for the waves produced in the plate by the different actuators to add in a constructive way, the actuators are placed at points of the surface vibrating in phase. At an eigen frequency of the plate, the contributions of two actuators excited with the same signal but located in points vibrating in phase opposition interfere in a destructive way, resulting in a zero excitation. Driving with a single signal thus dictates constraints on the location of actuators according to the excited normal mode.

Furthermore, the normal modes of a plate have an alternation of vibration antinodes having a maximum amplitude, and of nodes having a zero amplitude. The modal excitation therefore produces a vibration field and therefore a non-homogeneous friction coefficient decrease on the surface.

Moreover, in order to obtain a high amplitude at an eigen frequency, the attenuation of vibrations in the surface must be low. But, this low attenuation implies a long response time of the system, which restricts the fineness of the tactile textures that can be reproduced.

Moreover, there are tactile interfaces using the time reversal method, for example described in document C. Hudin, J. Lozada, et V. Hayward, «*Localized Tactile Feedback on a Transparent Surface through Time-Reversal Wave Focusing*», IEEE Transactions on Haptics, vol. 8, no 2, p. 188 198, April 2015. The interface includes a glass plate and actuators disposed in contact with and at the periphery of the glass plate. The piezoelectric actuators propagate acoustic waves in a glass plate. This device enables a pulse of a few μs to be produced at a desired point of the surface, the pulse having a high amplitude, for example in the order of 10 μm.

This document suggests repeating the method of time reversal focusing in order to form a movement pulse train to provide an intensified stimulation. However, this repetition of pulses does not make it possible to obtain a noteworthy acoustic lubrication effect.

DISCLOSURE OF THE INVENTION

A purpose of the invention is consequently an interface able to generate a noteworthy acoustic lubrication effect, especially a tactile stimulation interface enabling for example a texture to be simulated.

The above-stated purpose is reached by an interface including a surface, at least one actuator able to apply a strain to the surface, and means for controlling said actuator implementing a time reversal method associated with a convolution by a continuous function representative of the desired acoustic lubrication effect.

The discontinuous character of the pulses generated at the focusing point by the time reversal method is transformed into a continuous movement by convoluting the reversed pulse responses of the time reversal method at a focusing point by a continuous function. The continuous movement to the focusing point simulates in a localised way the desired effect. For example, the representative function can be a sine function, a square function, a sawtooth function, or even a random function.

Convolution by a continuous function decreases the amplitude at the focusing point, if the latter is insufficient to be perceived, it is sufficient to generate a lubrication effect.

In other words, the inventors have succeeded in generated an acoustic lubrication effect by implementing a time reversal method.

In the case of a tactile interface, by implementing a time reversal method, stimulation is localised, it is then possible to generate at several fingers different friction levels.

Moreover, the pulses produced by this method have high amplitudes, for example in the order of 1 μm. It is then not necessary to use a surface having a low attenuation. Lubrication levels can then more quickly vary, the simulated textures are then finer.

Very advantageously, the actuators implemented in an interface applying a time reversal method can be disposed with a great freedom. They are preferably disposed at the edges of the surface, and do not therefore hinder the visibility of a screen which would be disposed under the surface.

In an advantageous embodiment, the level of generated lubrication is modulated, thus the friction level varies when moving the finger, for example to confirm the user he/she actually follows the proper path on the surface, or to simulate a texture. The subject-matter of the present invention is then an interface including a surface, at least one actuator intended to apply a strain to said surface, and means for controlling said at least one actuator, said control means being intended to send to the actuator signals corresponding to the strains to be applied to said surface, said strains being determined by a time reversal method, wherein the control means include a database of reversed pulse responses, a database of the acoustic lubrication effects including at least one continuous function representative of an acoustic lubrication effect, and means for convoluting a reversed pulse response by a continuous function, and wherein the control means are able, to produce an acoustic lubrication in at least one given area of the surface, to generate at least one signal formed from a convolution of a reversed pulse response determined from the database of reversed pulse responses by a continuous function of the database of the acoustic lubrication effects.

In an advantageous example, the control means are able to control said at least one actuator so that different acoustic lubrications are simultaneously generated in at least two zones of the surface.

For example, the database of the acoustic lubrication effects includes at least one sine function.

Advantageously, the interface includes means for detecting the contact of at least one object with the surface and means for tracking the relative displacement of said object and of the surface. The means for detecting the contact of at least one object with the surface and/or the means for tracking the relative displacement of said object and of the surface can be of the capacitive type, so as to only produce an acoustic lubrication at the contact between the object and the surface.

According to an additional feature, the interface can include means for detecting the contact force between at least one object and the surface, and the control means can be able to modulate the acoustic lubrication effect as a function of said contact force.

The tactile stimulation interface can advantageously include several actuators.

The surface is for example carried by a plate, the actuator(s) being located in contact with the plate at least at an edge thereof. The plate is advantageously transparent.

Another subject-matter of the present invention is also a tactile stimulation interface including an interface according to the invention, the surface being intended to be tactilely explored by at least one user's organ.

The control means are advantageously able to modulate the acoustic lubrication effect as a function of the relative displacement of said organ and of said surface so as to simulate a texture effect.

The control means can also advantageously be able, from the database of reversed pulse responses, to send to the actuator signals corresponding to strains to be applied to said surface so as to tactilely stimulate said organ according to a given tactile pattern.

According to an additional feature, the tactile stimulation interface can include means for at least decreasing the adhesion of said organ to the surface due to a moisture build-up.

Another subject-matter of the present invention is also a method for controlling an interface according to the invention, so as to generate at least one acoustic lubrication effect in at least one first given area, including the steps of:

a) determining a reversed pulse response, b) selecting a continuous function as a function of the desired acoustic lubrication effect, c) convoluting said reversed pulse response by said continuous function, d) generating a signal based on the result of said convolution and sending said signal to said at least one actuator and generating pulses.

Steps a) to d) are simultaneously advantageously performed for the first area and for at least one second area distinct from the first area, and during step d) the signal sent to said actuator is advantageously the sum of the signal generated for the first area and of the signal generated for the second area.

In an exemplary embodiment, during step a), the reversed pulse response is chosen from a database.

In another exemplary embodiment, during step a), the reversed pulse response is determined by interpolation between at least two reversed pulse responses chosen from a database.

In the case where the interface is a tactile stimulation interface, the method can include a step prior to step a) of detecting a contact area between the organ and the finger, and, during step a), the reversed pulse response can be determined for said contact area.

The control method can include a step, before step d), of modulating the acoustic lubrication effect as a function of the relative displacement of an organ in contact with the surface.

Advantageously, the force exerted by the organ on the surface is measured and is taken into account to modulate the acoustic lubrication effect.

BRIEF DESCRIPTION OF THE DRAWINGS

The present invention will be better understood based on the following description and on the appended drawings in which:

FIG. 1A is a top view of an exemplary embodiment of a tactile stimulation interface, FIG. 1B is a cross-section view of FIG. 1A along the plane A-A, FIG. 1C is a detailed view of FIG. 1B at an actuator.

DETAILED DISCLOSURE OF PARTICULAR EMBODIMENTS

Figure 2:
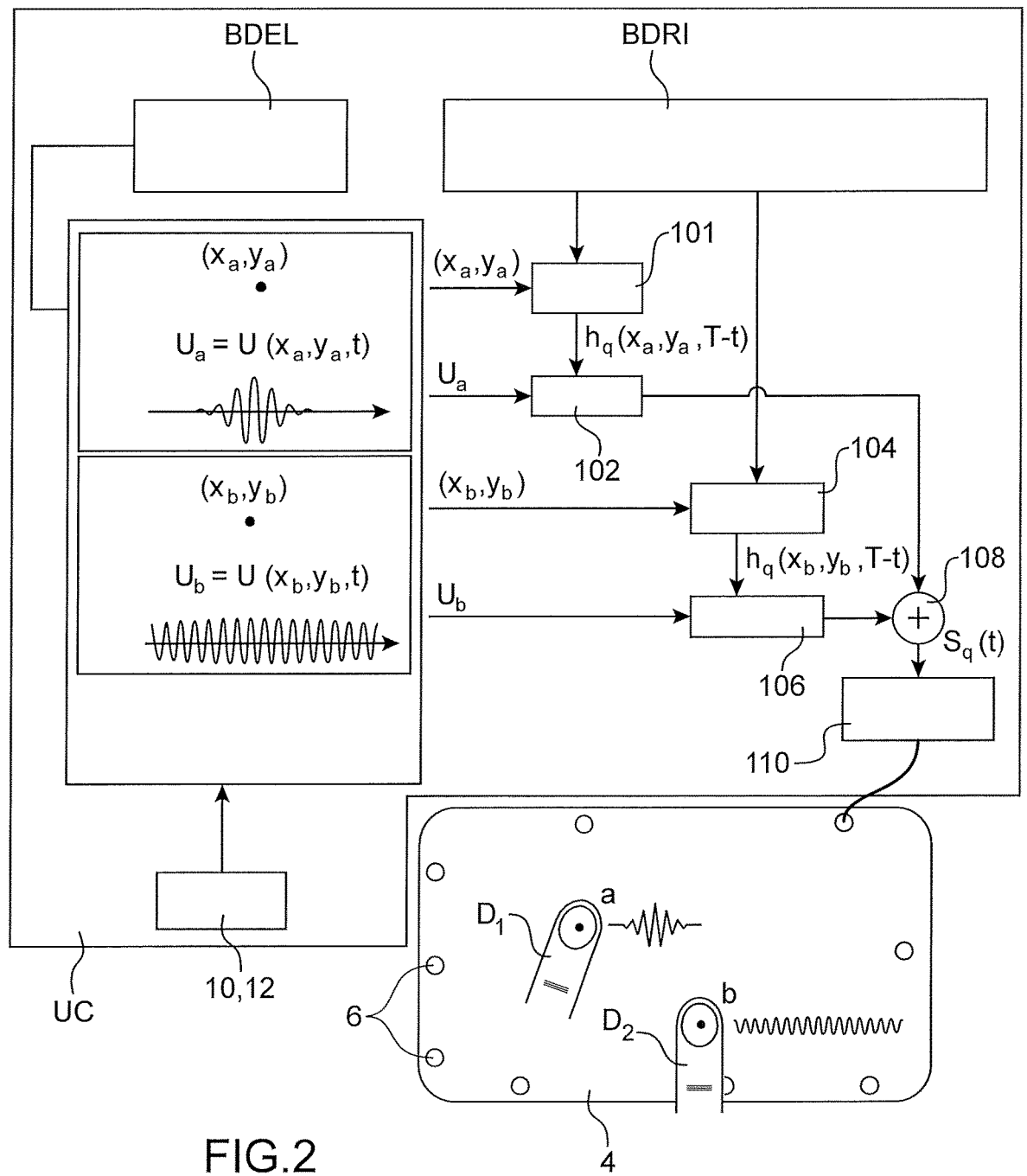
FIG. 2 is a schematic description of a flow diagram of the method for generating control signals for the actuators of a tactile interface according to the invention.

In the following description, the invention will be mainly described in the application to a tactile stimulation interface.

However, the invention applies to an interface designed for example to manipulate objects.

In the following description, it will be considered that a touch surface is intended to be touched by the pad of a finger or of several fingers for the sake of simplicity. But the surface of the interface according to the invention is able to apply a stimulation to any part of the operator's body sensitive to the sense of the touch.

By "focusing point", it is meant the point where the acoustic waves are focused and which is the seat of a high amplitude movement of the surface and by "stimulation area", it is meant the area where it is desired to generate an ultrasonic lubrication.

The acoustic lubrication effect requires a movement between the fingers and the surface. In the following description, the finger is moved with respect to the surface. A system in which the surface would be moved with respect to the fixed finger or any other part of the body, or in which the surface and the finger or any other part of the body would be mobile, falls within the scope of the present invention.

In FIGS. 1A to 1C, a first exemplary embodiment of a tactile interface according to the invention can be seen.

The tactile interface 11 includes a frame 2, an element 3 having a surface 4 held in the frame 2, and on which for example one finger or fingers can come in contact, and actuators 6 fixed to the element 3 and able to apply a mechanical stress to the surface 4, the stress being transversally oriented with respect to the surface. The suspended part of the surface 4 forms a surface intended to be tactilely explored. In the case of an object manipulation interface, the surface 4 is intended to support object(s).

The element 3 is, in the represented example, as a plate.

The frame forms a rigid support for the plate 3. Advantageously, a damping material 9 is interposed between the plate 3 and the rigid support. Advantageously the damping material 9 is an adhesive foam, which in addition to attenuating vibrations in the plate 3, keeps the plate 3 ont the frame.

The actuators 6 are fixed, for example by gluing on the face 11 of the element 3 opposite to the surface 4. In the represented example, the actuators are mounted along the edge of the element 3. In another example, the actuators can be disposed at any point of the element 3. Furthermore, the actuators could be on the touch surface 4.

The surface 4 is intended to be the seat of bending waves or transverse waves generated by the stresses applied by the actuators. According to the invention, the bending waves are focused so as to produce a tactile stimulation at the focusing point.

The element carrying the surface 4 is for example a transparent or non-transparent rigid substrate. The substrate can be planar or curved. The substrate can include one or several materials. Furthermore, it can have a thickness between 0.1 mm and 5 mm.

For example, the element bearing the surface 4 is for example a transparent plate made of glass, polycarbonate, PMMA, or a non-transparent plate made of metal, ceramic, plastic or other.

The implementation of a transparent substrate enables for example the interface to be adapted to a screen, for example to the screen of a touch tablet.

In the represented example, the actuators are piezoelectric actuators. They include a piezoelectric material and two electrodes on either side of the piezoelectric material enabling a potential difference to be applied thereto. The application of a potential difference across the piezoelectric actuator produces at the surface of the plate strains tangent to the plate. This strain curves the surface of the plate. That results in a movement in the direction perpendicular to the plane of the surface.

Alternatively, the actuators can be electromagnetical actuators. In this case a strain perpendicular to the plane of the surface is produced by the action of an electromagnetical field on a magnet. The magnet or the coil is attached to the surface.

In the represented example, the interface includes thirty-two actuators disposed along the edges of the surface 4, however this number is not limiting. For example 1, 10 or several tens of actuators, for example 40, can be provided, distributed on the support.

The interface also includes a control unit intended to generate signals to the actuators so that they apply strains to the surface so as to generate bending waves at a given focusing point.

The strains applied by the actuators 6 to the surface 4 are calculated by a time reversal method, which enables the actuators to generate waves interfering in a constructive way at one or several given point(s) of the surface and at a given time. The user does not feel the waves propagating in the plate but feels the pulse produced at the point(s) and at the given time due to the constructive interference. The gain of the actuators is set so that the amplitude everywhere else, outside the focusing point, is such that the vibration is not perceived. The contrast, which refers to the ratio between the amplitude at the focusing point and the mean square amplitude at any other point is therefore a critical magnitude which should be maximised to produce a stimulation clearly perceived at the focusing point without creating a stimulus at any other point. In the presented example, the contrast for a single focusing is C=43 and the amplitude at the focusing point reaches a=14 µm.

The adhesive foam present in the example is used, on the one hand to hold the plate on its support and on the other hand to attenuate the vibrations thereof. This attenuation enables the attenuation constant $\tau$ to be decreased and therefore a focusing repetition period $T_r$ to be reduced without affecting the contrast of repeated focusing $\hat{C}$, in accordance to the expression given below. This attenuation can also be adjusted by an appropriate choice of material for the plate or by adding a film to its surface.

Advantageously, the surface is such that it limits, or even prevents the adhesion of the skin to the surface due to the moisture build-up. For example, it can be considered that the plate carrying the surface is made of a porous material, for example of a porous glass, or with a surface state limiting the effective contact surface with the finger. For example, the surface undergoes a hydrophobic treatment or is covered with a hydrophobic film. The thickness of the film, for example between a few tens and a few hundreds of µm, is such that the film has little or no effect on the stimulation transmission from the surface to the finger. The film is for example glued or deposited on the surface.

The interface also includes a control unit UC intended to generate signals to the actuators so that they apply strains to the surface 4, in order to vary at one or several focusing points the friction level, for example in order to reproduce or simulate a texture, which can be a softer texture or roughness.

To do so, the control unit implements a time reversal method determining reversed pulse responses in order to generate a movement of a given point of the surface, known as the focusing point and a convolution of these reversed pulse responses by a continuous signal.

The interface also includes a control unit UC intended to generate signals to the actuators so that they apply strains to the surface 4 so as to generate bending waves at a given focusing point.

The strains applied by the actuators 6 to the surface 4 are calculated by a time reversal method, which enables the actuators to generate constructive progressive waves at one or several given point(s) of the surface and at a given time. The user does not feel the passage of a progressive wave, but feels the amplitude reached at the point(s) and at the desired time due to the constructive interference. The gain of the actuators is set so that the amplitude everywhere else, outside the focusing point, is lower than the tactile sensitivity threshold. The tactile sensitivity threshold refers to the lowest perceptible vibratory amplitude. It depends on the contact conditions and on the frequency but is around 10 µm. The movement of the surface can therefore be amplified or attenuated so that only the amplitude reached at the focusing points is greater than this threshold and is therefore perceptible. The surface thus seems motionless except at the focusing points.

The interface advantageously includes detection means 10 for detecting the presence of the user's fingers on the interface in order to generate an acoustic lubrication at the contact areas of the finger(s) with the surface. The acoustic lubrication can then be only generated during the exploration by the fingers. The electric consumption of the interface can then be decreased which is particularly interesting in the case of tactile stimulation interfaces applied to portable apparatuses. They can be for example means of the capacitive or optical type. The interface also includes means for tracking the position of the finger(s) 12.

In the case of a capacitive detection, the plate carrying the surface forms one of the plates of a variable capacitor and the pad of the finger forms the other plate. It is furthermore possible to determine the direction and the way in which the user intends to move his/her finger on the surface, which makes it possible to avoid a delay effect in the simulation. To do so, force sensors can be implemented to measure the tangential strains produced by the motion of the finger on the surface. These strains are produced by the friction and have a direction opposite to the motion. The strains exerted by the finger on the plate are transmitted to the plate at its support. Such force sensors can then be disposed at the interface between the plate and its support.

The principle of the time reversal method will now be briefly described.

The principle of the time reversal of the waves is based on the invariance of the wave propagation equation by time reversal and on the reciprocity principle.

Let $h(x_a|x_a, y_a|y_a, t)$ the out-of-plane movement of the surface registered during time t at a point of coordinates $(x_a, y_a)$ after a pulse signal has been emitted by an actuator at $(x_a, y_a)$. The pulse response between points a and is called $h(x_a|x_a, y_a|y_a, t)$.

Considering that the response of the plate and actuator system is linear, if the actuator located at q no longer emits a pulse but emits a signal $s_q(t)$, the movement to the point a is then given by: $u(x_a, y_a, t) = h(x_a|x_a, y_a|y_a, t) \otimes s_a(t)$ with $\otimes$ being the convolution operator.

Thus, if the actuator located at q no longer emits a pulse but emits the time reversed pulse response from the instant T until the initial instant t=0, let $$s_a(t) = h(x_a|x_a, y_a|y_a, T-t) \text{ with } 0 < t < T,$$

the movement produced in any point b will be:

$$u(x_b, y_b, t) = h(x_b|x_q, y_b|y_q, t) \otimes s_q(t) =$$
$$h(x_b|x_q, y_b|y_q, t) \otimes h(x_a|x_q, y_a|y_q, T-t) =$$
$$\int_0^t h(x_b|x_q, y_b|y_q, t-\xi) h(x_a|x_q, y_a|y_q, T-\xi) d\xi$$

The movement is thus the result of the integral of the product of two functions which are not a priori correlated, the result of which has therefore a zero average. There is at a point b and at any instant t a movement with a zero average which forms a basic vibration present on the whole plate. On the contrary, at the instant t=T corresponding to the end of the emission phase by the actuator, a movement at the point a is obtained:

$$u(x_a, y_a, T) = \int_0^T h(x_a|x_q, y_a|y_q, T-\xi)^2 d\xi.$$

This time a strictly positive quantity is integrated. The result is a high amplitude non-zero movement. This movement is only obtained at the point a and at the instant T, hence the wave focusing in space and in time.

In the case where Q actuators are used, their contributions add to give:

$$u(x, y, t) = \sum_{q=1}^{Q} u_q(x, y, t).$$

The contrast is defined as the ratio between the movement at the focusing point at the instant T and the standard deviation of this movement at any point b. It is obtained by the relationship:

$$C = \sqrt{BT_c} \sqrt{\frac{Q\tau(1 - e^{-2T/\tau})}{(Q+1)\tau\left(1 - e^{\frac{2T}{\tau}}\right) + T_c}}$$

with Q being the number of actuators, T the duration of the reversal window, τ the attenuation time constant of the vibrations in the plate and Ta the characteristic time of the plate or modal density of the plate in seconds, or normal mode per Hz and .B=$f_{max}$=$f_{min}$ the bandwidth, in hertz of the signals emitted by the actuators.

Since the focusing is repeated in time with a period $T_r$, the contrast is affected according to the relationship:

$$\hat{C} = C\sqrt[4]{1 - e^{-2T_r/\tau}}.$$

To preserve the contrast, the successive focusings are repeated with a period $T_r \geq \tau$.

The medium frequency of the signals defines the maximum resolution which can be reached by the relationship:

$$R_s = \sqrt[4]{\frac{D}{\rho_s}} \sqrt{\frac{8}{2\pi f_m}}$$

with $R_s$ being the spatial resolution, or full width at half maximum of the focusing point, $$f_m = \frac{f_{max} + f_{min}}{2}$$

the medium frequency of the emitted signals, D the stiffness in flexure and $\rho_s$ the weight per unit area of the plate.

The pulse responses $h_{Ani}(t)$ can be obtained, either experimentally and by effectively registering the pulse responses, or by simulation, or analytically when the geometry remains simple.

Then, a database of the reversed pulse responses at different points of the surface is made, this database is used to generate the signals sent to the actuators. It can be any points of the surface or according to a very tight gridding, in order to ensure a high resolution in the stimulation. As a variant and particularly advantageously, a database of the pulse responses at a number of given points of the surface is made, for example distributed as a grid or on an edge of the surface. The pulse responses between the points of the grid are then determined, for example by interpolation, which thus enables a pulse response to be determined at any point of the surface, and the time for making the database and its size to be reduced. The interpolation can be made according to different methods, for example it can be a Fourier interpolation, the compressed sensing method, the fundamental solution methods, or a method based on a variational form of the propagation equation.

FIG. 2 shows a schematic description of the method for generating signals to actuators of a tactile interface according to the invention. A schematic example of a tactile interface is represented, it implements 7 actuators.

In the represented example, the control unit simultaneously generates lubrication areas a and b for two fingers D1 and D2.

It is desired to generate a first lubrication in the area a and a second lubrication in the area b.

The control unit includes a database of the acoustic lubrication effects BDEL including continuous functions representative of acoustic lubrication effects.

The first lubrication is represented by the continuous function Ua=U(xa, ya, t) which is a sine burst function, and the second lubrication is represented by the continuous function Ub=U(xb, yb, t) which is a sine function. The lubrication effect obtained for each of these functions is different.

The lubrication effect is related to the amplitude, that is the vibration envelop. In the case of the function Ua, the lubrication effect only lasts a short time, since the pattern has changed or because the finger moves and it is no longer necessary to lubricate. In the case of the function Ub, lubrication is kept.

The location of each focusing point is determined by its coordinates in the (x, y) reference system designated (xa, ya) and (xb, yb).

In a first step, the presence of the finger is detected, for example by detecting the contact of the finger(s) with the surface, so as to only generate a lubrication while fingers are present.

In a following step, the signal to be sent to each actuator is determined.

For the area a and the first lubrication Ua: first the reversed pulse responses at the point a is searched for in the database BDRI of the reversed pulse responses. Either the response exists, since it has been previously determined, or it is determined by spatial interpolation as explained above (step 100). This response is designated hq(xa, ya, T−t).

Each pulse response is then convoluted by the continuous lubrication function Ua (step 102).

The same steps are performed for the area b (steps 104 and 106), the reversed pulse response is convoluted by the continuous lubrication function Ub.

The convolution of the waveform Ua with a reversed pulse response corresponds to filtering this waveform so as to obtain, after propagation in the medium, a movement conform to this waveform at the desired point.

A signal corresponding to the sum of the signals calculated for each point (step 108) is sent to an actuator. This set of operations is simultaneously performed for all the actuators of the surface.

Very advantageously, a step for amplifying 110 the signal occurs.

Thus each actuator receives a continuous signal and applies a continuous strain to the surface, resulting in a continuous movement to the focusing points a and b.

The continuous function used for the convolution may vary, thus different continuous functions can be associated with a same area and one of these is selected for the convolution as a function of parameters such as time, a display on the screen, an operator's action . . . . Furthermore, a new continuous function can be established by combining at least two functions of the database.

As abovementioned, the movement of the finger(s) on the surface is tracked, or even the movement of the finger is predicted, the signals sent to the actuators are therefore continuously recalculated to generate an acoustic lubrication on the movement path of the finger(s). In the case where the finger is fixed and the surface is moved, the control unit uses information on the movement of the surface to generate the signals for the actuators. In the case where the finger(s) is/are moving and the surface is moved, the control unit takes into account the information on the movement of the surface and detects the movement of the finger to generate the signals for the actuators.

Thus, a different lubrication effect can be generated for each finger in the areas a and b, the friction coefficient between the finger and the surface is then decreased.

Advantageously, the maximum frequency of each continuous function is such that it avoids resonating the surface. Thus, different lubrications can be generated in different areas of the surface.

The continuous function is typically a sinusoid of ultrasonic frequency, known as a carrier frequency, which is amplitude modulated by a function the frequency of which is comprised in the tactile sensitivity band, i.e. preferably lower than <1 kHz. The carrier frequency is ideally in the ultrasonic range, preferably greater than 20 kHz and can reach up to several tens, or even several hundreds of kHz. Preferably, the frequency of the continuous function does not correspond to a resonance frequency of the surface. The continuous function can be written as the product of a carrier P by a modulation function M, let $U(t)=P(t) \times M(t)$.

The continuous function representative of the desired lubrication can alternatively be a square function, a sawtooth function, or even a random function.

Figure 3A:
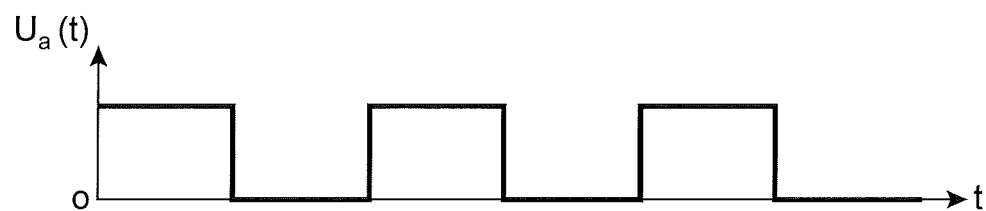
FIGS. 3A to 3C are examples of continuous functions representative of the desired simulation.

For example, in the case of a square function such as represented in FIG. 3A, the top half-period of a square function applies a lubrication effect to the finger in contact with the surface, which decreases the friction. In the bottom half-period, the lubrication is lower. In this example no lubrication is generated, the natural friction of the material of the surface applies to the finger. The finger which moves on the surface then undergoes two distinct frictions.

Figure 3B:
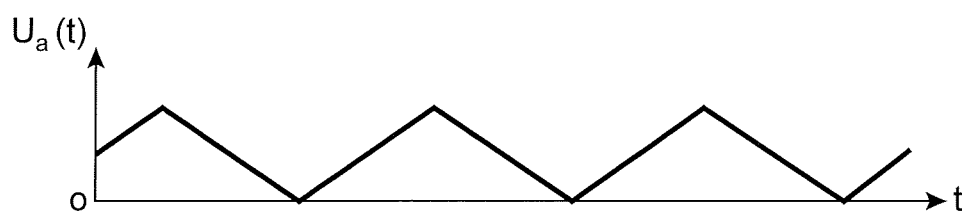

In FIG. 3B, a triangular function can be seen with which the decrease of the friction applied to the finger is gradual and the increase of the friction applied to the finger is also gradual.

Figure 3C:
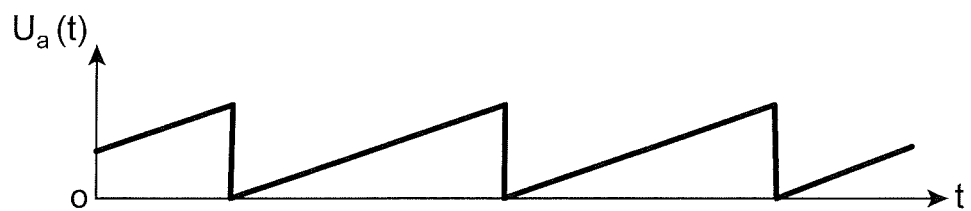

In the case of a sawtooth function such as represented in FIG. 3C, the latter applies a friction change to the finger during the rise and instantly comes back to 0.

The convolution by the function Ua generates a signal for the actuator(s) in order to generate at the focusing point a time variable amplitude movement. The lubrication level is then modulated over time.

Advantageously, modulating the lubrication level during the movement can be considered, which results in modulating the friction coefficient. The choice of an adapted modulation makes it possible to transmit a confirmation signal to the user indicating it is on the proper path. Indeed this modulation of the friction coefficient keeps a certain attention of the user and reassures the latter.

Taking into account the strength of the pressing force(s) of the fingers on the surface can be considered to modulate the lubrication effect, for example it could be considered that the greater the strength of the force exerted by a finger on the surface, the greater the lubrication level.

As mentioned above, the continuous function can write as the product of a carrier P by a modulation function M, let $U(t)=P(t)\times M(t)$. Very advantageously, $M(t)$ can be a continuous function enabling, by modulating the lubrication level during the movement of the finger on the surface, a texture to be simulated. Indeed, by choosing the type of modulation, any type of texture can be simulated. For example, a rough or a polished surface can be simulated.

For example, if $M(t)$ slowly evolves, the texture is perceived as an undulation of the surface. When the evolutions of $M(t)$ are quick, the user perceives a finer granularity. For a velvet, there would be a slow sinusoid, a rough surface can be a random signal having quick variations. A polished, that is constantly smooth, surface corresponds to a constant function $M(t)$ at a high value.

In the application to a touch screen, the actuator(s) are advantageously disposed at the edges of the surface so as not to hinder the visibility of the screen. In the case where the surface would not be transparent, the actuator(s) could be disposed at any place of the surface.

The advantage of the tactile stimulation interface according to the present invention is to be able, on the one hand, to reproduce a texture as described above, and on the other hand to simulate a relief, a confirmation click or a local stiffness by using the actuators and the database of reversed pulse responses.

The interface according to the present invention can be for example implemented in touch tablets in screens, in dashboards, multifunction touch phones.

The interface according to the present invention can also be implemented in the field of micromanipulation, optics, biology.

The invention claimed is:

1. An interface including a surface, at least one actuator configured to apply a strain to said surface, and a controller for controlling said at least one actuator, said controller being configured to send to the actuator signals corresponding to the strains to be applied to said surface, said strains being determined by a time reversal method, wherein the controller includes a database of reversed pulse responses, and database of acoustic lubrication effects including at least one continuous function representative of an acoustic lubrication effect, and is configured to convolute a reversed pulse response by a continuous function, and wherein the controller is configured, to produce an acoustic lubrication in at least one given area of the surface, to generate at least one signal formed from a convolution of a reversed pulse response determined from the database of reversed pulse responses by a continuous function of the database of the acoustic lubrication effects.

2. The interface according to claim 1, wherein the controller is configured to control said at least one actuator so that different acoustic lubrications are simultaneously generated in at least two areas of the surface.

3. The interface according to claim 1, wherein the database of the acoustic lubrication effects includes at least one sine function.

4. The interface according to claim 1, including at least one detector for detecting the contact of at least one object with the surface and at least one tracking device for tracking the relative displacement of said object and of the surface.

5. The interface according to claim 4, wherein the at least one detector and/or the at least one tracking device are of the capacitive type, so as to only produce an acoustic lubrication at the contact between the object and the surface.

6. The interface according to claim 1, including at least one detector for detecting a contact force between at least one object and the surface and wherein the controller is configured to modulate the acoustic lubrication effect as a function of said contact force.

7. The interface according to claim 1, wherein the at least one actuator includes several actuators.

8. The interface according to claim 1, wherein the surface is carried by a plate, the at least one actuator being located in contact with the plate at least at an edge thereof.

9. The interface according to claim 8, wherein the plate is transparent.

10. A tactile stimulation interface including an interface according to claim 1, the surface being configured to be tactilely explored by at least one user's organ.

11. The tactile stimulation interface according to claim 10, wherein the controller is configured to modulate the acoustic lubrication effect as a function of the relative displacement of said organ and of said surface so as to simulate a texture effect.

12. The tactile stimulation interface according to claim 10, wherein the controller is also configured, from the database of reversed pulse responses, to send to the at least one actuator signals corresponding to strains to be applied to said surface so as to tactilely stimulate said organ according to a given tactile pattern.

13. The tactile stimulation interface according to claim 11, including a device for at least decreasing the adhesion of said organ to the surface due to moisture build-up.

14. A control method for controlling an interface according to claim 1, so as to generate at least one acoustic lubrication effect in at least one first given area, including the steps of:
  a) determining a reversed pulse response,
  b) selecting a continuous function as a function of the desired acoustic lubrication effect,
  c) convoluting said reversed pulse response by said continuous function,
  d) generating a signal based on the result of said convolution and sending said signal to said at least one actuator and generating pulses.

15. The control method according to claim 14, wherein steps a) to d) are simultaneously performed for the first area and for at least one second area distinct from the first area, and wherein during step d) the signal sent to said actuator is the sum of the signal generated for the first area and of the signal generated for the second area.

16. The control method according to claim 14, wherein during step a), the reversed pulse response is chosen from a database.

17. The control method according to claim 14, wherein, during step a), the reversed pulse response is determined by interpolation between at least two reversed pulse responses chosen from a database.

18. The control method according to claim 14, the interface being a tactile stimulation interface, said method including a step prior to step a) of detecting a contact area between the organ and the finger, and wherein, during step a), the reversed pulse response is determined for said contact area.

19. The control method according to claim 18, including a step, before step d), of modulating the acoustic lubrication effect as a function of the relative displacement of an organ in contact with the surface.

20. The control method according to claim 18, wherein the force exerted by the organ on the surface is measured and is taken into account to modulate the acoustic lubrication effect.

* * * * *